United States Patent
Howe et al.

(10) Patent No.: US 6,849,974 B2
(45) Date of Patent: Feb. 1, 2005

(54) ALTERNATOR AND METHOD OF MANUFACTURE

(75) Inventors: Steven E. Howe, Reed City, MI (US); Donald C. Lipscomb, Jr., Dorr, MI (US)

(73) Assignee: Altech Generating Systems, LLC, Bay City, MI (US)

(*) Notice: Subject to any disclaimer, the term of this patent is extended or adjusted under 35 U.S.C. 154(b) by 0 days.

(21) Appl. No.: 10/794,908

(22) Filed: Mar. 5, 2004

(65) Prior Publication Data

US 2004/0169429 A1 Sep. 2, 2004

Related U.S. Application Data

(63) Continuation of application No. 10/098,782, filed on Mar. 14, 2002, now Pat. No. 6,774,518.
(60) Provisional application No. 60/276,723, filed on Mar. 16, 2001.

(51) Int. Cl.$^7$ .................. H02K 5/00; H02K 15/02
(52) U.S. Cl. ................. 310/89; 310/43; 310/90; 29/596; 29/598
(58) Field of Search ............... 310/42–43, 89–91; 29/596, 598

(56) References Cited

U.S. PATENT DOCUMENTS

| | | |
|---|---|---|
| 3,150,278 A | 9/1964 | Clark |
| 3,622,822 A | 11/1971 | Lofstrand |
| 3,758,799 A | 9/1973 | Dochtermann et al. |
| 3,873,861 A | 3/1975 | Halm |
| 3,874,073 A * | 4/1975 | Dochterman et al. ......... 29/598 |
| 3,900,749 A | 8/1975 | Carriker |
| 4,101,082 A | 7/1978 | Mayer et al. |
| 4,104,927 A | 8/1978 | Jensen et al. |
| 4,275,321 A | 6/1981 | Shimamoto et al. |
| 4,284,914 A | 8/1981 | Hagenlocher et al. |
| 4,284,915 A | 8/1981 | Hagenlocher et al. |
| 4,288,711 A | 9/1981 | Hagenlocher et al. |
| 4,342,929 A | 8/1982 | Horne |
| 4,360,749 A | 11/1982 | Neumann et al. |
| 4,369,384 A | 1/1983 | Nardi |
| 4,459,088 A | 7/1984 | McClain |
| 4,492,855 A | 1/1985 | Garczynski et al. |
| 4,604,538 A | 8/1986 | Merrill et al. |
| 4,606,000 A | 8/1986 | Steele et al. |
| 4,613,129 A | 9/1986 | Schroeder et al. |
| 4,631,433 A | 12/1986 | Stokes |
| 4,659,950 A | 4/1987 | Gotoh |
| 4,689,507 A | 8/1987 | Baker et al. |
| 4,705,983 A | 11/1987 | Franz et al. |
| 4,723,894 A | 2/1988 | Marx |
| 4,755,709 A | 7/1988 | De Jager |
| 4,853,570 A | 8/1989 | Isozumi et al. |
| 4,866,324 A | 9/1989 | Yuzawa et al. |
| 4,879,483 A | 11/1989 | Barahia |
| 4,897,571 A | 1/1990 | Isozumi |
| 4,904,891 A | 2/1990 | Baker et al. |
| 4,918,324 A | 4/1990 | Isozumi |
| 4,959,576 A | 9/1990 | Horibe et al. |

(List continued on next page.)

*Primary Examiner*—Thanh Lam
(74) *Attorney, Agent, or Firm*—Howard & Howard

(57) ABSTRACT

An alternator has a molded plastic, electrically conductive D.E. frame in which a sealed bearing is molded in place with the formation of the D.E. frame 14. When the D.E. frame is removed from its plastics injection mold and while the frame is still hot, the stator is installed in the D.E. frame and the frame allowed to cool and constrict about the stator. The companion S.R.E. frame is preferably fabricated of non-conductive plastics material.

11 Claims, 5 Drawing Sheets

U.S. PATENT DOCUMENTS

| | | |
|---|---|---|
| 5,049,770 A | 9/1991 | Gaeth et al. |
| 5,068,556 A | 11/1991 | Lykes et al. |
| 5,126,608 A | 6/1992 | Sogabe et al. |
| 5,148,256 A | 9/1992 | Potash et al. |
| 5,268,607 A | 12/1993 | McManus |
| 5,296,722 A | 3/1994 | Potash et al. |
| 5,313,698 A * | 5/1994 | Schaeftlmeier et al. ....... 29/596 |
| 5,315,195 A | 5/1994 | Bradfield et al. |
| 5,500,994 A * | 3/1996 | Itaya ........................... 29/598 |
| 5,561,334 A | 10/1996 | Ishida et al. |
| 5,625,242 A | 4/1997 | Shiga et al. |
| 5,640,062 A | 6/1997 | Yockey |
| 5,698,914 A | 12/1997 | Shiga et al. |
| 5,705,865 A | 1/1998 | Ishida et al. |
| 5,710,474 A | 1/1998 | Mulgrave |
| 5,742,498 A | 4/1998 | Taniguchi et al. |
| 5,773,906 A | 6/1998 | Mukai et al. |
| 5,942,827 A | 8/1999 | Neumann et al. |
| 5,970,940 A | 10/1999 | Penton |
| 5,982,057 A | 11/1999 | Imada et al. |
| 6,002,185 A | 12/1999 | Nakao et al. |
| 6,034,464 A | 3/2000 | Asao |
| 6,058,594 A | 5/2000 | Neumann et al. |
| 6,153,070 A | 11/2000 | Maurer et al. |
| 6,153,725 A | 11/2000 | Angelopoulos et al. |
| 6,304,012 B1 | 10/2001 | Chen et al. |
| 6,489,702 B1 | 12/2002 | Bartman |
| 6,625,868 B2 * | 9/2003 | Rahbar et al. ................ 29/596 |
| 2002/0053841 A1 | 5/2002 | Asao |

* cited by examiner

FIG - 5
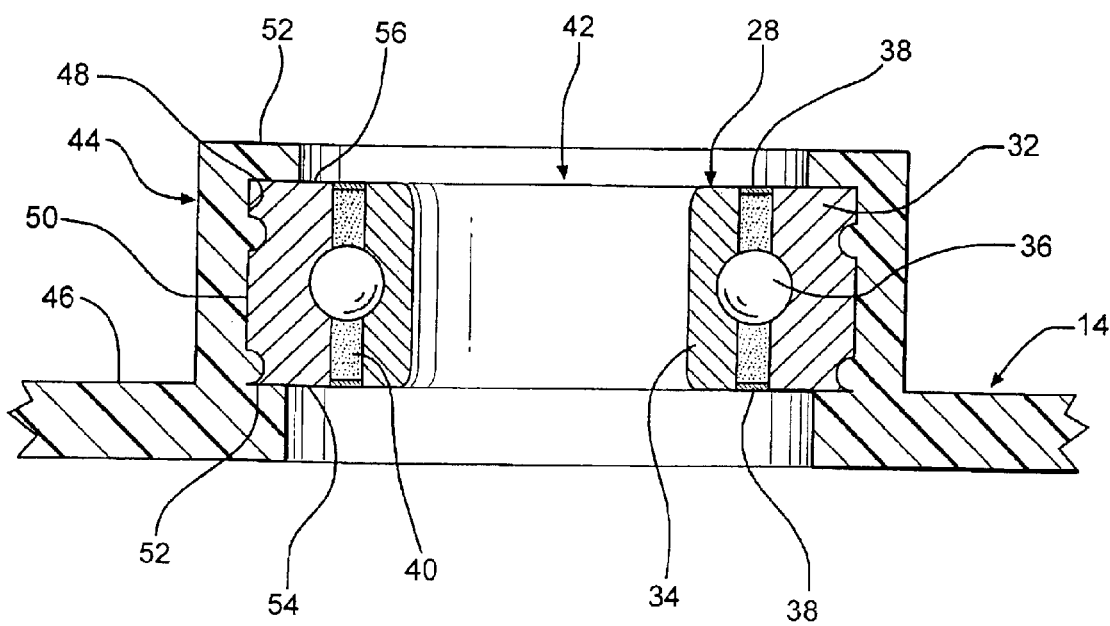
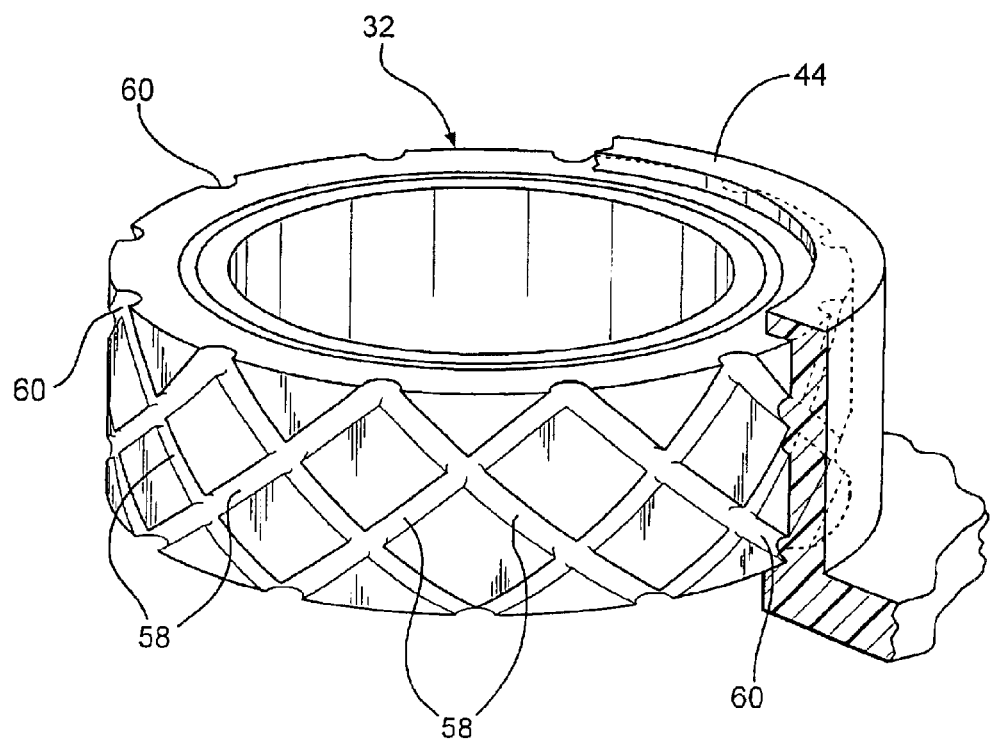
FIG - 6

ALTERNATOR AND METHOD OF MANUFACTURE

This application is a continuation of U.S. application Ser. No. 10/098,782, filed Mar. 14, 2002 now U.S. Pat. No. 6,774,518 which claims priority to U.S. provisional patent application Ser. No. 60/276,723, filed Mar. 16, 2001.

TECHNICAL FIELD

This invention relates generally to alternators for internal combustion engine applications and the like and to methods of manufacturing such alternators, and further to the manufacture of molded plastic housings for electrical devices generally having a bearing for supporting a rotating shaft.

RELATED ART

Alternators, particularly those for automotive engine applications, are fabricated with drive-end (D.E.) and a stator-regulator-end (S.R.E.) frames which house a stator and rotor and support the other components that make up the alternator. The stator is normally fitted in the D.E. frame. Both frames are typically cast from aluminum and have several surfaces that require secondary machining to prepare the surfaces to support a corresponding component of the alternator. One of those surfaces is the stator bore of the D.E. frame which supports the stator. Once machined, the D.E. frame is heated to expand the stator bore at which point the stator is inserted into the D.E. frame and the frame then cooled to shrink the D.E. frame about the stator to retain the stator in place. The machining and heating operations add to the cost of manufacturing such alternators.

Aluminum is typically employed for the D.E. frame for its ability to provide a ground path for the stator and for its strength and dimensional stability at elevated operating temperatures of the stator.

Included among the other machined surfaces of such aluminum D.E. frames is a bearing well whose inner surface is machined to receive a sealed D.E. roller bearing with a press fit. The well includes a lip of aluminum material extending about the opening of the bearing well which, after installation of the bearing, is spun over onto the outer race to capture the bearing axially within the well. The secondary machining and lip deformation operations further add to the cost of alternators. Moreover, when it is desired to rebuild a spent alternator, the spun-over lip must be ground off and the D.E. frame modified with a retro-fit metal retainer fastened to the bearing well in position of the former spun-overlip. Such process involves remachining of the bearing well wall, removal of the spun-overlip and machining of the frame to receive the retainer ring, and the provision and fastening of the retainer ring to make use of the otherwise spent, aluminum D.E. frame. Such adds cost to the rebuilding of spent alternators.

Other surfaces that require machining are the mating surfaces of the D.E. and S.R.E. frames, which are brought together and then secured by fasteners. Also machined are several bores which are fitted with pressed steel bushings for mounting the alternator in service. Such dissimilar metal materials (i.e., steel against aluminum) present issues of corrosion which must be contended with.

U.S. Pat. No. 4,705,983 discloses an alternator having, as part of its structure, an end shield fabricated of insulating plastics material and formed with a central molded hub that, after forming, is provided to seat a roller bearing.

U.S. Pat. No. 5,982,057 discloses molding a plastics housing in place about a stator of an electric motor along with a molded-in bearing bush. Following molding, a roller bearing is installed in the bearing bush. Provision of the molded-in bearing bush adds cost and complexity to the structure.

It is an object of the invention to overcome or greatly minimize the foregoing limitations in connection with alternators and other electrical devices employing a plastic housing to support a bearing of the art.

SUMMARY OF THE INVENTION AND ADVANTAGES

According to one aspect of the invention, an alternator is provided comprising a D.E. frame having an electrical grounding portion; a stator secured to the D.E. frame remote from the grounding portion; a D.E. bearing secured to the D.E. frame; a S.R.E. frame secured to the D.E. frame, a S.R.E. bearing secured to the S.R.E. frame, a rotor housed within the D.E. and S.R.E. frames and journaled by the D.E. and S.R.E. bearings for rotation relative to the rotor, and wherein the D.E. frame is fabricated of plastics material and includes an electrically conductive ground circuit coupling the stator electrically to the ground portion. This aspect of the invention has the advantage of providing a plastics D.E. housing which is less costly and lighter weight than the aluminum counterparts and yet is provided with a ground path for the stator.

According to a further aspect of the invention, a housing assembly, such as the D.E. or S.R.E. frame of an alternator, includes a sealed roller bearing having inner and outer races and roller elements therebetween, and a molded plastics housing having a bearing well within which the sealed roller bearing is molded in place. The bearing well includes an inner wall surface engaging an outer surface of the outer race, and axial restraining portions which extend radially inwardly from the inner wall of the well in overlying relation to axially opposite end faces of the outer face for restraining the bearing axially against removal from the bearing well. According to a related method of the invention, during molding, the bearing is maintained at a temperature in the mold below that which would cause heat damage to the bearing. This aspect of the invention has the advantage of providing a simple, effective way of securing a sealed, heat-sensitive roller bearing within a housing, such as an alternator frame, which avoids machining or pressing operations or provision of a premolded bearing bush. The same technique and features are applicable to other plastics housings of electrical devices in which the bearing is molded in place in the housing.

According to yet another aspect of the invention, an alternator is formed according to a method in which the D.E. frame is molded from plastics material and is removed from the mold. While still hot, the stator is installed in the D.E. frame and the plastics material allowed to cool to constrict about the stator to secure the stator in place in the D.E. frame.

According to still a further aspect of the invention, a ground path is molded in place in a plastic housing of an electrical component to establish a defined electrical path through the plastics housing.

THE DRAWINGS

A presently preferred embodiment of the invention is disclosed in the following description and in the accompanying drawings, wherein:

FIG. 5 is an enlarged fragmentary cross-sectional view taken generally along lines 5—5 of FIG. 2; and FIG. 6 is an enlarged perspective view of a bearing whose outer race is formed with retaining grooves shown interlocked with retaining ribs of the housing.

DETAILED DESCRIPTION

Figure 1:
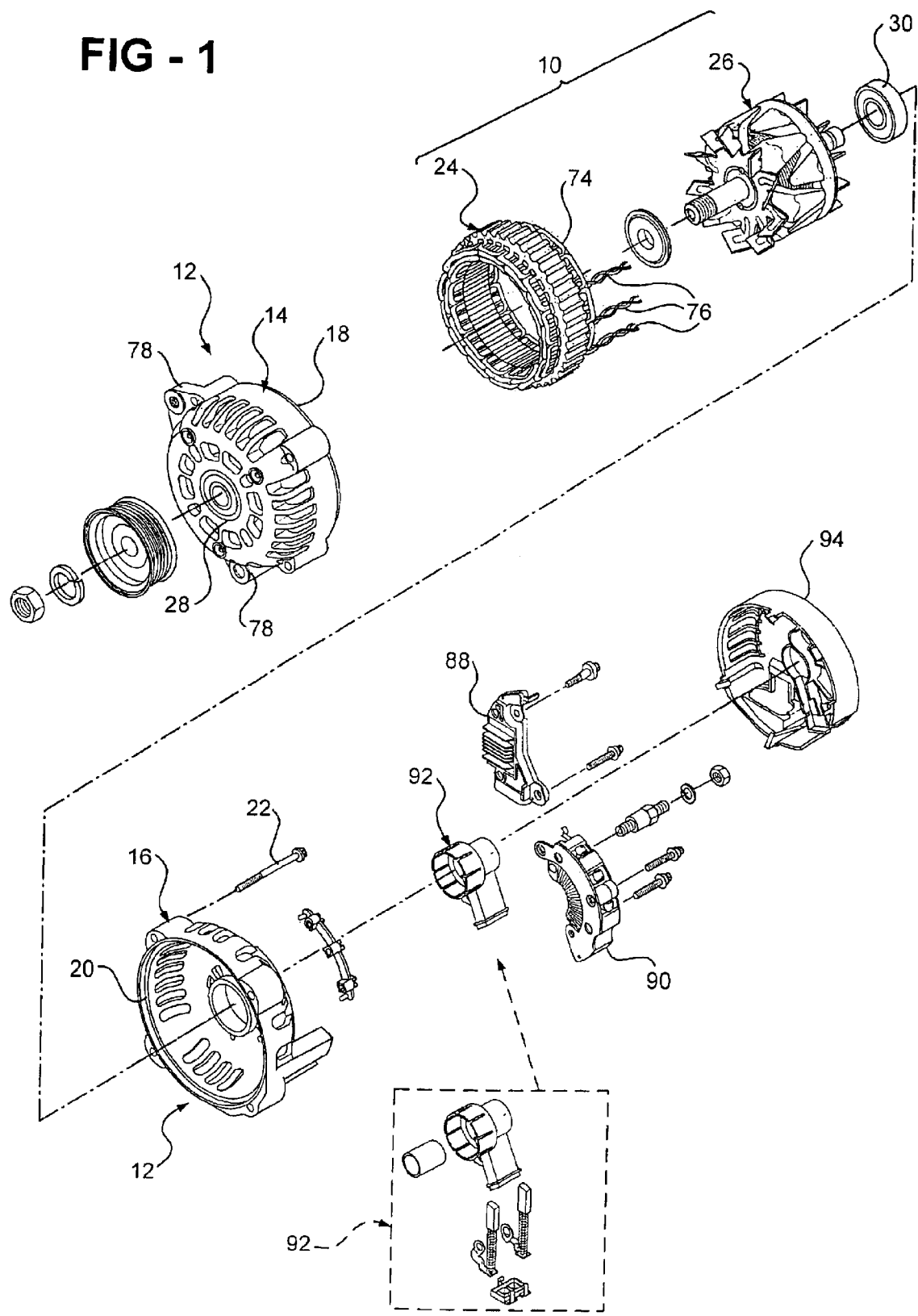
FIG. 1 is an exploded perspective view of an alternator constructed according to a presently preferred embodiment of the invention.

Referring initially to FIG. 1, an exploded perspective view of an alternator 10 is shown constructing according to a presently preferred embodiment of the invention. The alternator 10 includes a housing assembly 12 comprised of a drive-end (D.E.) frame 14, and a stator-regulator-end (S.R.E.) frame 16 which are joined at mating flanges 18, 20 and secured by bolts 22 to house therein a stator 24 and a rotor 26.

The D.E. frame 14 is molded of plastics material and mounts a D.E. bearing 28. The S.R.E. frame 16 is likewise preferably fabricated of plastics material and mounts a corresponding S.R.E. bearing 30. The bearings 28, 30 are double sealed roller bearings of the type schematically illustrated in FIG. 5 including an outer race 32, an inner race 34 and a plurality of rolling elements, such as the illustrated bearing balls 36, captured between the outer and inner races 32, 34 to enable the inner race 34 to rotate relative to the outer race 32. Annular seals 38 span the gap between the inner and outer race to provide a sealed environment to the roller elements 36, which are lubricated with grease 40. Such sealed roller bearings 28, 30 are heat-sensitive, in that if the bearings 28, 30 are heated above a critical upper operational limit temperature, either the seals 38 overheat and fail and/or the grease 40 within the bearings 28, 30 liquefies and leaks out of the bearings past the seals 38 and the bearing fails. The critical upper limit operating temperature will vary depending on the type of grease and seals employed in a given bearing, and an understanding of the operating limits are known by those of ordinary skill in the art of alternators and bearings. The bearings 28, 30 surround openings in the frames 14, 16 through which a shaft of the rotor 26 extends and is journaled by the bearings.

According to one aspect of the invention, at least the D.E. bearing 28 is molded in-place with the formation of the D.E. frame 14 and preferably the S.R.E. frame 16. As shown best in FIG. 5, the bearing 28 is inserted in a mold (not shown) configured to form the D.E. frame 14 into which hot, flowable plastics material is introduced which, as shown, flows around the bearing 28 to capture the bearing 28 within a bearing well 42 of the D.E. frame 14. More specifically, the bearing well 42 is comprised of a cylindrical hub or bearing well ball portion 44 projecting axially inwardly from an end wall 46 of the D.E. frame 14. The hub 44 has an inner wall surface 48 which engages an outer peripheral surface 50 of the outer race 32. An annular retaining portion or flange 52 molded as one piece with the D.E. frame 14 projects radially inwardly from the inner wall surface 48 on opposite axial sides of the D.E. bearing 28 in overlying relationship to axially opposite end faces 54, 56 and in radially outer spaced relation to the inner race 34 for restraining the D.E. bearing within the bearing well 42 in both axial directions via upper and lower retaining portions 52, 53 and radially via the inner wall surface 48. In this way, the bearing 28 is captured in place during molding by the structure of the D.E. frame alone. The lower retaining portion 53 forms part of the end wall 46 of the frame and extends from the opening 55 in the end wall 46 to the bearing well wall or hub 44.

As shown in FIG. 6, the outer surface 50 of the outer race 32 may be formed with a series of retaining grooves 58 which are recessed into the outer surface 50. During molding, the grooves 58 are filled with the plastics material of the D.E. frame 14 to provide interlocking retaining ribs 60 of the D.E. frame 14. The grooves 58 and ribs 60 are preferably transverse to the longitudinal axis and lateral plane of the outer race 32, such that the interlocking grooves 58 and ribs 60 crisscross one another and constrain the outer race 32 against longitudinal movement along the axis as well as rotational movement about the axis of the outer race 32. The grooves 58 may be ground into the outer surface 50 or provided by other suitable means. The grooves preferably have a depth of about 0.020–0.030 inches and a width of about 0.060 inches. The same technique for molding in place a bearing in a plastic housing is equally applicable to other housing components such as electric starters and the like.

Figure 2:
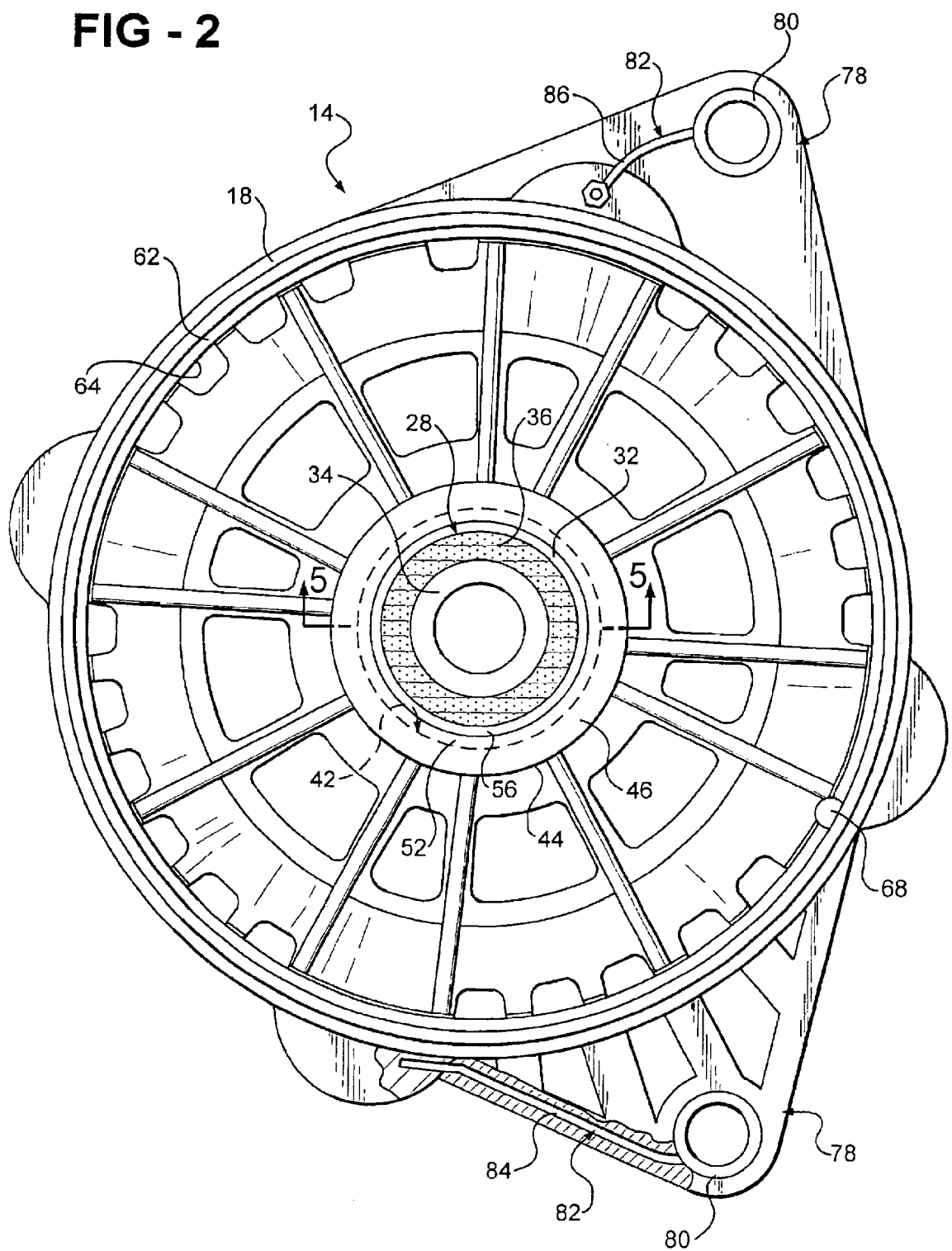
FIG. 2 is an enlarged elevation view looking into the D.E. frame.
Figure 3:
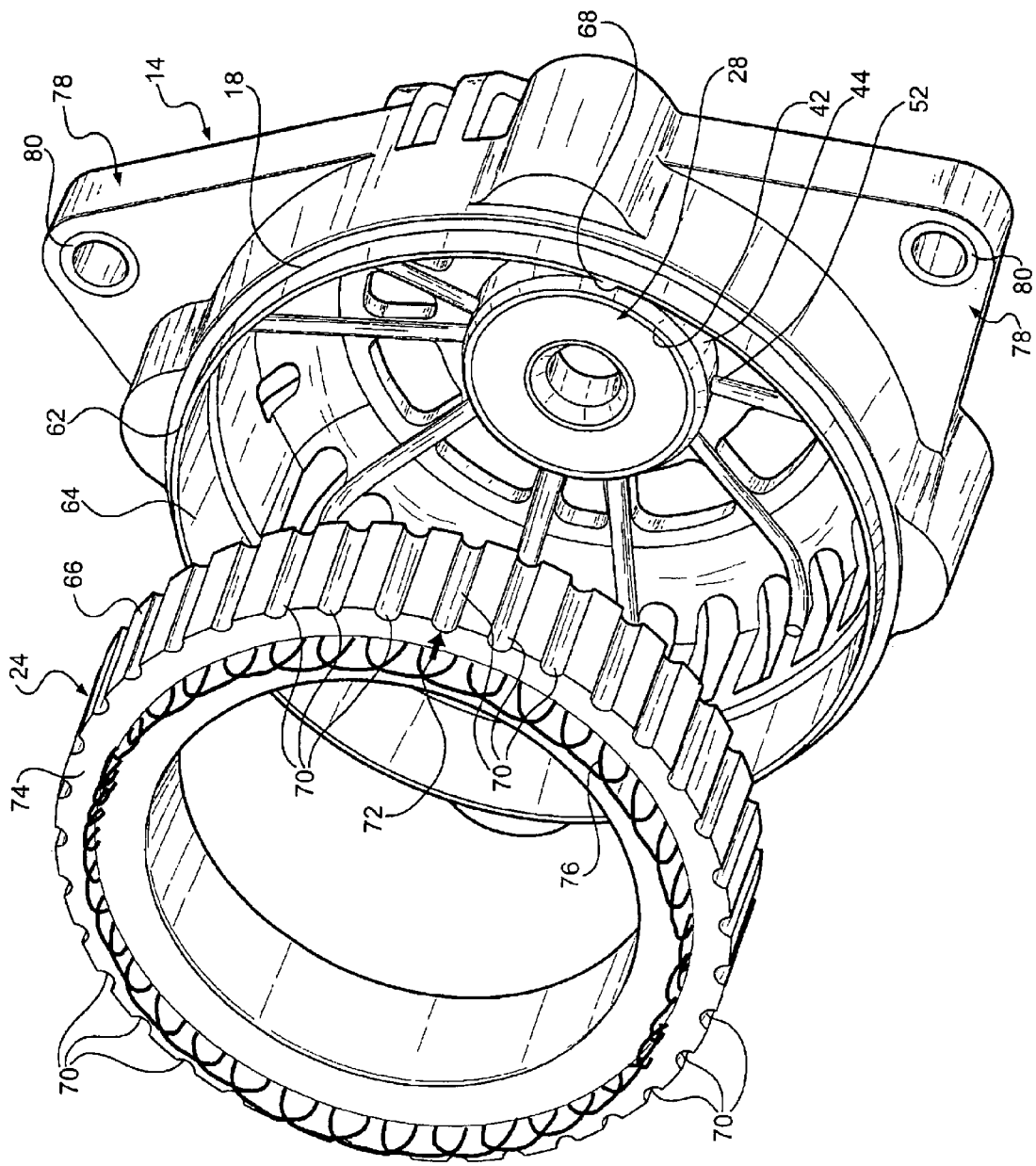
FIG. 3 is an enlarged, exploded perspective view of the D.E. frame and stator prior to their assembly.

Turning now to FIGS. 2 and 3, the D.E. frame 14 has a stator hub 62 provided by an outer peripheral wall of the frame 14 formed with an inner stator bearing surface 64 which, in its as-molded state without machining, is sized to engage an outer surface 66 of the stator 24 with sufficient frictional interference to secure the stator 24 within the D.E. frame 14.

According to the invention, the D.E. frame 14 is molded such that the stator bearing surface 64 has a size in relation to the outer surface 66 of the stator 24 that, when the D.E. frame 14 is cooled to ambient temperature, tightly constricts about and grips the outer surface 66 of the stator 24 to secure the stator 24 in place within the D.E. frame 14. According to a preferred aspect of the invention, the D.E. frame 14 is molded initially without the stator 24. Upon solidification of the plastics material of the D.E. frame 14, but while the D.E. frame 14 is still hot from molding, the D.E. frame 14 is removed from the mold and, while still hot, the stator 24 is inserted into the stator hub 62 of the D.E. frame 14. The temperature, of course, will vary depending upon the material used to form the D.E. frame 14. However, at the temperature of removal from the mold, the heat of the D.E. frame 14 causes the stator bearing surface 64 to be in an expanded state whereby the stator 24 can be inserted into the stator hub 62 with very little effort due to the radial clearance between the stator 24 and stator hub 62. Once installed, the D.E. frame 14 is allowed to cool, which causes the stator bearing surface 64 to constrict tightly about the outer surface 66 of the stator 24, securing the stator 24 both axially and rotatably against movement relative to the D.E. frame 14 and preventing its removal from the frame 14.

Figure 4:
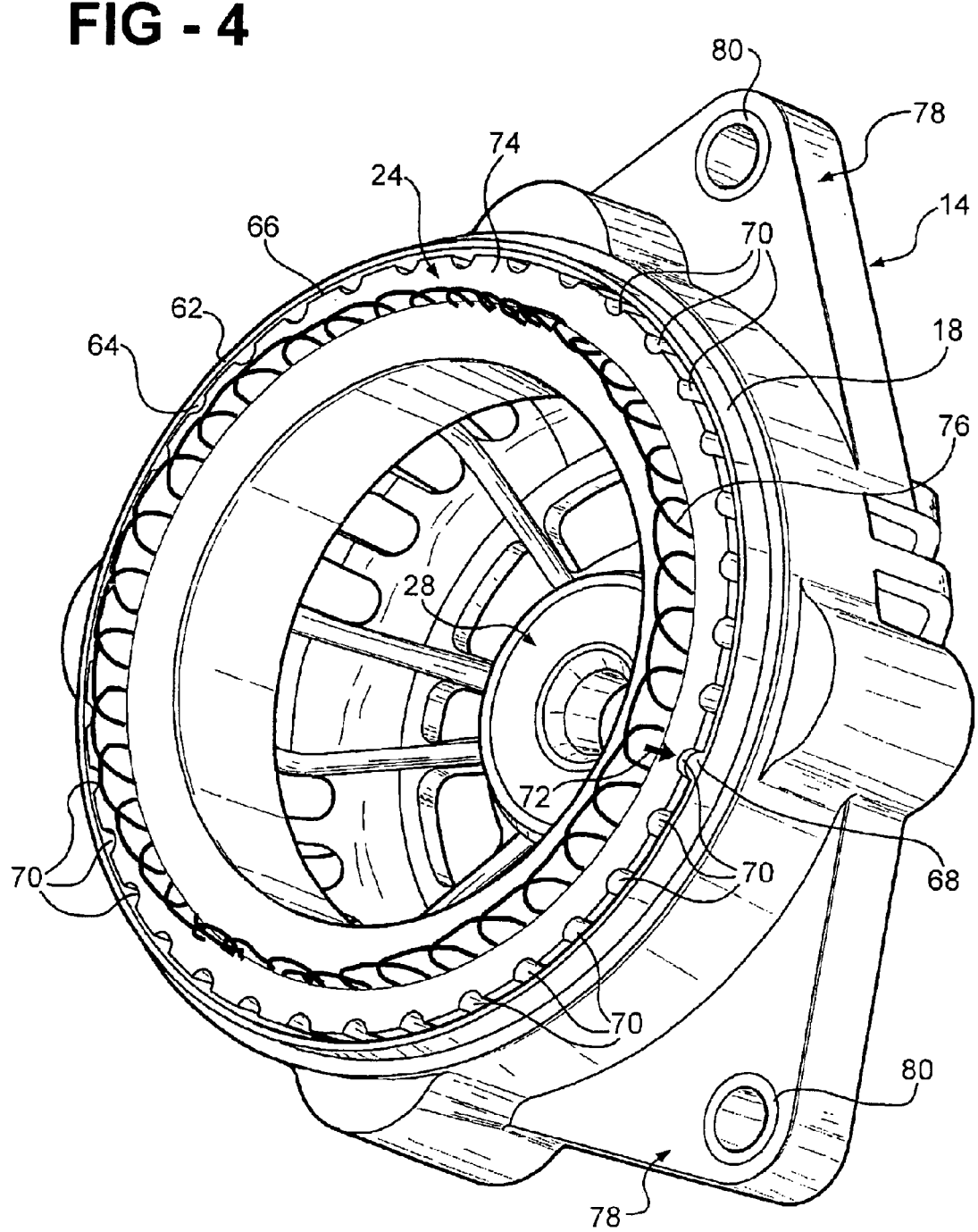
FIG. 4 is a view like FIG. 3 following assembly of the stator in the D.E. frame.

Preferably, the inner cylindrical stator bearing surface 64 is formed with an alignment rib 68 which projects radially inwardly from the surface 64. The alignment rib 68 extends axially along the surface 64 of the stator hub 62. The alignment rib 68 is thus fixed relative to the frame 14 and projects inwardly from the stator bearing surface 64. The outer surface 66 of the stator 24 is formed with a plurality of axial grooves 70, any one of which can receive the rib 68. In most cases, the stator 24 will have a preferred angular orientation relative to the D.E. frame 14. As illustrated in FIGS. 3 and 4, the stator 24 can be marked with a visible alignment indicator 72 positioned such that when aligned with the alignment rib 68 the stator 24 is in the proper angular orientation relative to the D.E. frame 14. As shown in FIG. 4, during installation of the stator 24 when the D.E.

frame 14 is still hot from the mold, the appropriate groove 70 associated with the alignment indicator 72 is guided into position over the alignment rib 68 to quickly, easily and positively orient the stator 24 precisely relative to the D.E. frame so as to eliminate variation between components.

The stator 24 preferably includes a stack of metal laminates 74 and copper windings 76.

The D.E. frame 14 is preferably formed with at least one and, as illustrated here, a pair of electrically grounding portions 78 in the form of ears which have molded-in metal bushings or sleeves 80 defining lined bolt holes for received bolts (not shown) which mount the alternator 10 to the frame or other structure of a vehicle or the like and provides, by that connection, a grounding vehicle. The sleeves 80 are preferably aluminum.

The plastics molded D.E. frame 14 includes an electrically conductive ground circuit which couples the stator 24 electrically to the grounding portion 78. According to one aspect of the invention, the D.E. frame 14 is molded from an electrically conductive plastics composite material which renders the entire D.E. frame 14 conductive and thus establishing the ground path. Suitable materials are those which can withstand the operating temperature of an alternator while maintaining adequate strength and stability to provide the needed support of the D.E. frame 14. Among the candidate materials are high temperature, heat stabilized polyamide resins having a carbon fiber fill of about 35 to 50 vol % which renders the composite electrically conductive to provide the electrically conductive path from the rotor 26 to the grounding portion 78. One such material is manufactured by E.I. du Pont de Nemours (DuPont) under the Zytel® family. Alternatively, or in addition to conduction by the composite material per se, the ground path 82 may be provided by an embedded wire 84 leading to the sleeve 80 and molded in place during the molding of the D.E. frame 14, or an external wire 86 added after molding the D.E. frame 14. The same technique for providing a molded-in ground path is applicable to housings of other electrical devices, such as starters and the like.

According to a further aspect of the invention, the S.R.E. frame 16 is fabricated of a plastics material that is relatively non-conductive in relation to the conductivity of the D.E. frame 14. In other words, the S.R.E. frame 16 is more insulating than electrically conductive in relation to the properties of the D.E. frame 14. The S.R.E. frame 16 may be fabricated of a substantially non-conductive plastics material. A suitable material may comprise 35–50 vol % glass fiber-filled polyamide resin of the Zytel® family. Making the S.R.E. frame 16 from non-electrically conductive plastics material has the advantage of insulating many of the component parts mounted on the S.R.E. frame which normally require special insulating shields and the like to prevent conductive between the components and the usual aluminum S.R.E. frame. Mounted on the backside of the S.R.E. frame 16 is a regulator 88, a rectifier 90, and a brush holder assembly 92. When installed, these components are concealed by an end cover 94 which likewise may be plastic. With the non-conductive plastic S.R.E. frame 16, there is no need to electrically insulate the regulator 88 and rectifier 90 from the S.R.E. frame 16, which greatly simplifies and reduces the cost of manufacturing alternators.

The invention further contemplates methods in remanufacturing spent alternators both of the traditional metal frame construction and those of the plastic frame variety of the invention. In either case, the rotor and bearing, along with any other inserts, are removed from the D.E. frame and a new D.E. frame 14 molded from the plastics material as previously described, preferably including the molded-end bearing 28. The spent plastic D.E. frame 14 can be ground and recycled. The stator 24 is installed by the same process of inserting it into the frame 14 when the frame 14 is hot out of the mold.

The disclosed embodiment is representative of a presently preferred form of the invention, but is intended to be illustrative rather than definitive thereof. The invention is defined in the claims.

We claim:

1. A method of fabricating an alternator comprising:
   preparing a stator;
   molding a drive-end (D.E.) frame of plastics material in a mold;
   removing the molded D.E. frame from the mold and, while the D.E. frame is still hot from heat imparted by molding, installing the stator in the D.E. frame and permitting the D.E. frame to cool and constrict about the stator to secure the stator to the D.E. frame.

2. The method of claim 1 in which the stator includes a plurality of channels, and forming the D.E. frame with a locator rib.

3. The method of claim 2 wherein prior to installing the stator in the D.E. frame, manipulating the stator to locate the stator in a predetermined angular position relative to the D.E. frame corresponding to angular alignment of a portion of the stator with the locator rib, and securing the stator in the predetermined angular position by disposing the locator rib in an associated one of the channels of the stator corresponding to such predetermined angular position upon installing the stator in the D.E. frame.

4. The method of claim 1 including molding a sealed bearing having an inner race, and outer race, and rolling elements between the inner and outer races in the D.E. frame during the molding of the D.E. frame and controlling the temperature of the bearing to prevent damage to the bearing from molding.

5. The method of claim 1 including forming a grounding portion on the D.E. housing and forming an electrically conductive ground circuit from the stator to the grounding portion of the D.E. frame.

6. The method of claim 5 wherein the ground circuit is formed by molding the D.E. frame from an electrically conductive plastics composite material as the plastics material.

7. The method of claim 5 wherein the ground circuit is formed by molding an electrically conductive wire in the D.E. frame during the molding of the frame.

8. A method of fabricating an alternator comprising:
   providing a sealed bearing having an inner race, an outer race, and lubricated rolling elements disposed between the inner and outer races;
   inserting the sealed bearing in a mold configured to form a plastics drive-end (D.E.) frame of the alternator; and
   introducing hot, flowable plastics material into the mold and molding the plastics material about the outer race of the sealed bearing to secure the bearing to the resultant molded plastics D.E. frame, while controlling the heat in the mold to protect the bearing against heat damage.

9. The method of claim 8 including molding a bearing well in the D.E. frame including side walls surrounding an outer surface of the outer race of the bearing and a retainer portion projecting radially inwardly from the wall at opposite ends thereof in overlying relation to opposite end faces of the outer race to capture the bearing axially in the bearing well.

10. A method of remanufacturing spent alternators having a metallic drive-end (D.E.) frame, a stator secured to the D.E. frame, and a sealed bearing received in a bearing well of the D.E. frame and retained axially against removal by a spun-over lip of the D.E. frame overlying an outer race of the sealed bearing, said method comprising:

removing the stator and bearing from the metal D.E. frame of the spent alternator;

inserting a sealed bearing in a mold configured to form a plastics D.E. frame;

introducing hot, flowable plastics material into the mold and flowing the plastics material about the inserted bearing while maintaining the bearing at a temperature below which the bearing would be damaged from heat to mold the bearing in place in the resultant plastics D.E. frame; and removing the plastics D.E. frame from the mold; and while the plastics D.E. frame is still hot out of the mold, inserting a stator in the plastics D.E. frame and allowing the plastics D.E. frame to cool and constrict about the stator to secure the stator to the plastics D.E. frame.

11. A method of remanufacturing spent alternators having a drive-end (D.E.) frame molded of plastics material, a stator secured to the D.E. frame, and a sealed bearing secured to the frame, said method comprising:

fracturing the D.E. frame of the spent alternator to separate the stator and bearing from the D.E. frame;

introducing hot, flowable plastics material to a mold to form a new D.E. frame;

removing the new D.E. frame from the mold while the plastics material is still hot; and before the new D.E. frame cools to ambient temperatures, inserting a stator in the new D.E. frame and allowing the plastics material to cool and constrict about the stator.

\* \* \* \* \*